United States Patent Office 3,383,403
Patented May 14, 1968

3,383,403
DIMERIZATION PROCESS
Kenneth A. Pollart, Kirkwood, Mo., assignor to Monsanto Company, a corporation of Delaware
No Drawing. Filed Nov. 7, 1963, Ser. No. 322,038
11 Claims. (Cl. 260—479)

ABSTRACT OF THE DISCLOSURE

Preparation of propiolate ester dimers by the dimerization reaction of alkyl, aryl, alkenyl, or alkynyl propiolates in an inert non-active hydrogen containing liquid media in the presence of a tertiary amine catalyst at temperatures of from about −10° C. to about 100° C.

This invention relates to esters of propiolic acid. More particularly this invention provides an improved process for preparing propiolate ester dimers.

One of the biggest problems in preparing propiolate ester dimers is the possibility and occurrence of undesired side reactions which reduce the desired yield of dimer and cause the formation of complex difficulty identifiable by-products. Means to control these undesired side reactions have not been readily determinable. When attemps to conduct the dimerization using basic catalysts such as sodium methoxide were used, only complex mixtures of unseparable products were obtained.

Also, previous to this invention dimerization of propiolate esters was always restricted to the simplest of propiolate esters. This is believed to be because this was necessary to avoid the formation of the above described complex mixtures instead of propiolate dimer product. I have found that the dimerization process does not have to be so restricted if the dimerization is conducted according to this invention.

It is an object of this invention to provide a process for improving the yield of simple propiolate esters.

It is also an object of this invention to provide a process by which propiolate esters having long chained ester groups, aryl groups, and unsaturated aliphatic groups may be dimerized in an efficient manner.

I have found that if the propiolate ester is contacted with a tertiary amine in an inert solvent, the dimerization proceeds in a substantially improved manner to give higher yields of dimer than were previously available.

The propiolate ester to be dimerized may be any ester of propiolic acid containing only one propiolate group per molecule. Neither the ester reactant or the reaction mixture should contain any substantial amounts of an active hydrogen compound such as water, primary and secondary alcohols, polyols, amines, since these materials compete with the propiolate acetylenic group and react therewith to reduce the ultimate yield of propiolate ester dimer. However the reaction may be conducted in the presence of "non-active hydrogen" containing materials such as tertiary alcohols because these materials are not "active hydrogen" compounds. An "active hydrogen" compound is one which reacts through the hydrogen containing functional group such as —OH, —NH, —SH, etc., which reacts preferentially with the acetylenic triple bond of the propiolic acid moiety of the propiolate ester in competition with the acetylenic triple bond of a propiolic acid moiety of the propiolate ester.

The dimerization reaction may be conducted in the presence of any tertiary amine, although some tertiary amines are better than others for this purpose. The tertiary amine which is preferred in the process of this invention is triethylenediamine ("Dabco") since with this amine yields on the order of from about 80% to 90% have been obtained. Other suitable tertiary amine catalysts include pyridine, picoline, collidine, N-methylmorpholine, N-methylpiperidinne, N-ethylpiperidine, triethylamine, tributylamine, diethylcyclohexylamine, and various other alkyl, cycloalkyl, cyclic, and heterocyclic tertiary amines. The amount of catalyst can vary considerably, e.g., from small catalytic quantities to from 1% or 10% of the reaction mixture. With the preferred triethylenediamine catalyst only very small amounts are needed. I have found it suitable to use propiolate ester to catalyst mole ratios of from at about 5:01 to 100:1 preferably about 10:1. Higherquantities of catalyst tend to favor the formation of by-product polymeric material.

The self-condensation of the propiolate ester is generally conducted using a tertiary amine catalyst of the above exemplified type in the presence of an inert diluent or solvent in an amount sufficient to maintain suspension or solution and to dissipat the heat of reaction, especially with the lower molecular weight more reactive propiolate esters. The concentration of propiolate ester in the diluent or solvent is not critical. A 5% to 15% solution of the lower molecular weight propiolate is preferred; the concentration is less important with the higher molecular weight propiolates since the reaction is not so exothermic in those cases. Inert solvents which are suitable include the aromatic and aliphatic hydrocarbons and ethers which are liquid at temperatures of from about −10° C. to about 100° C. Examples include benzene, toluene, xylene, kerosene, gasoline, cyclohexane, cyclopentane, hexane, heptane, diethyl ether, dioxane, tetrahydrofuran, etc.

The dimerization may generally be conducted at temperatures ranging from about −10° C. to about 100° C. With the more reactive propiolate esters it is generally desirable to maintain the temperature below 25° C. and to mix the propiolate ester and the tertiary amine gradually, at least in initial runs, until the degree of exothermicity of the reaction is determined. With the higher molecular weight propiolate esters temperatures on the order of 60° to 80° C. are preferred to insure complete reaction. The reaction may be conducted in an open reaction vessel. Maintaining an inert atmosphere does not appear to improve the yield.

Reaction times on the order of from about 1 to 5 hours are usually sufficient to effect complete reaction in batch type operations. With the more reactive propiolates time periods of from about 1 to 3 hours are usually sufficient. Longer time periods of contact are not harmful since the propiolate dimer products are quite stable. The process may also be conducted in a continuous manner if desired.

When the dimerization reaction is completed the propiolate dimer product may be recovered from the reaction mixture by means known in the art. Generally, it is preferred to separate the product by evaporating the diluent or solvent from the product, dissolving the product in a suitable solvent, to separate the dimer product from the amine catalyst, and purifying the product by recrystallizing it from the solvent.

Propiolate esters wihch may be self-condensed or dimerized according to the process of this invention include the alkyl propiolates such as those having, say, from 1 to about 20 carbon atoms in the alkyl ester group, e.g., the methyl, ethyl, isopropyl, tert-butyl, heptyl, decyl, tridecyl, heptadecyl, octadecyl, and eicosyl propiolates, as well as the simple aryl propiolates having from 6 to about 12 carbon atoms in the aryl group such as the phenyl, o-, m-, or p-tolyl, the xylyls, biphenyl, and naphthyl propiolates, the unsaturated aliphatic propiolate esters of propiolic acid including the alkenyl and alkynyl propiolates having from say 3 to 12 carbon atoms in the respective alkenyl or alkynyl radicals, e.g., allyl propiolate and 4-heptenyl, 10-undecenyl, 11-dodecenyl propiolates, propargyl propiolate, 4-pentynyl propiolate, 7-octynyl propiolate, 10-undecynyl propiolate and the aralkenyl propiolates, e.g., cinnamyl propiolates, which are disclosed, e.g., in copending patent application, of Lee A. Miller, Ser. No. 80,028, filed Jan. 3, 1961, entitled "Unsaturated Esters of Propiolic Acid," now U.S. Patent No. 3,210,405 issued Oct. 5, 1965.

The dimerization of the process of this invention takes place across the triple bonds of the propiolic acid moieties of the reactant propiolate esters. To illustrate, the propiolate dimer products can be named generically as esters of hex-2-ene-4-yne-1,6-dicarboxylic acid because they have the following general structure

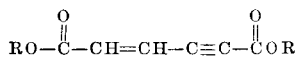

where R is the ester moiety of the propiolate ester used. For example, where methyl propiolate is dimerized according to the process of the invention, the dimer product may be named as dimethyl hex-2-ene-4-yne-1,6-dioate. Similarly, the dimer of allyl propiolate can be named as diallyl hex-2-ene-4-yne-1,6-dioate, the propiolate dimer of propargyl propiolate is dipropargyl hex-2-ene-4-yne-1,6-dioate; and the propiolate dimer of phenyl propiolate is named diphenyl hex-2-ene-4-yne-1,6-dioate.

The propiolate ester dimers are useful as cross-linking agents for hydroxy groups containing materials such as cellulosic paper. They are also useful as intermediates for preparing the halogenated products by adding hydrogen halide or elemental halogen across the unsaturated bonds of the molecule. The chlorinated products obtained by such treatment are useful as insecticides. The bis-acid compounds resulting from the hydrolysis of the bis-ester product of the process have shown activity as bacteriostats.

The process of this invention is further illustrated by the detailed examples.

EXAMPLE 1

To a stirred solution of 0.135 g. of triethylenediamine ("Dabco") in 50 ml. of benzene there was added 10 g. of methyl propiolate mixed in 30 ml. of benzene while the reaction temperature was kept below 10° C. A mildly exothermic reaction occurred and the solution slowly darkened until black. After the addition was completed the mixture was allowed to stir at room temperature overnight. The benzene solution thus obtained was washed three times with 10% hydrochloric acid, then once with water, and dried over anhydrous magnesium sulfate. The filtered benzene solution was concentrated under water pump vacuum using a rotary evaporator. A light brown solid was obtained which had a M.P. of 56–57° C. This solid weighed 9 g. and was redissolved and recrystalized from hexane and the light yellow solid obtained had a M.P. of 57° C.; this product was the dimer of methyl propiolate. Its melting point was same as that reported in Acta Chem. Scand., vol. 13, p. 198 (1959). The yield of dimer thus obtained was 90%. The structure of the product is as follows:

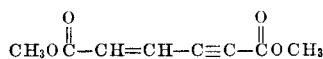

EXAMPLE 2

The procedure of Example 1 was followed wherein methyl propiolate was contacted with triethylenediamine except that the mixture of 40 ml. of tertiary butanol and 40 ml. of benzene was used as the solvent and the mixture was refluxed for 8 hours after the addition of the methyl propiolate in benzene to the catalyst was completed. Upon working up the reaction mixture in the manner described in Example 1 the only identifiable product was the methyl propiolate dimer ester having a M.P. of 57–58° C.

EXAMPLE 3

The procedure described in Example 1 was repeated except that triethylamine was used as a catalyst rather than triethylenediamine. For this run the benzene solution of 10 g. of methyl propiolate was added to 0.24 g. of triethylamine in benzene at 10° C. After the addition was completed the mixture was stirred at room temperature for 12 hours. The reaction mixture was then filtered. There was a large amount of black benzene insoluble solid obtained. The filtrate was washed with 10% hydrochloric acid solution, and then with water and dried over anhydrous magnesium sulfate. The dried solution, thus obtained, was filtered and evaporated using a rotary evaporator, as in Example 1 there was obtained 3 g. of dark solid, which was identified by its M.P. to be the dimer of methyl propiolate. The M.P. was 57–58° C.

EXAMPLE 4

To a stirred solution of 0.0024 mole (0.24 g.) of N-methylmorpholine at 10° C. there was added a benzene solution containing 10 g. of methyl propiolate. After the addition was completed the mixture was stirred at room temperature for 12 hours. The reaction mixture was washed with 10% hydrochloric acid solution, then with water, and dried over magnesium sulfate, as described in Example 1. The solution was concentrated using a rotary evaporator under water pump vacuum, there was obtained approximately 1 g. of a light yellow solid having a M.P. of 57–58°. It was thus identified to be the dimer of methyl propiolate.

EXAMPLE 5

A mixture of 19.2 g. of octadecyl propiolate 0.67 g. of "Dabco" and 180 ml. of tetrahydrofuran was stirred at room temperature for 1 hour and then heated at 60–65° C. for 4 hours and then allowed to stand overnight. The tetrahydrofuran solvent was stripped off using a rotary evaporator. The solid was taken up in benzene, washed with 10% aqueous hydrochloric acid solution, then washed with water, dried and then the benzene was removed. The solid which was obtained was dissolved in hot ethanol, decolarized with charcoal in a steam heated funnel and allowed to crystallize. The octadecyl propiolate dimer which was obtained, 17.5 g. (about 90% yield) had a melting point of 60–62° C., and was not further purified.

EXAMPLE 6

To a solution of 2 g. of the methyl propiolate dimer, obtained as described in Example 1, in 75 ml. of acetone there was added 47.6 ml. of 0.5 N sodium hydroxide over a three hour period. After the addition was completed the mixture was stirred for 15 minutes and then poured into a mixture of 1.5 ml. of concentrated sulfuric acid and ice and the mixture was allowed to stand over the week-end. The aqueous solution thus obtained was continuously extracted with ether for 4 hours. The ether was removed using a rotary evaporator and the resulting solid was recrystallized from nitroethane. The product thus obtained weighed 1.5 g. (90% yield) and had a melting point of 195–196° C. with decomposition.

The resulting bis-acid, thus obtained, was found to have bacterostatic action against the organisms *Bacillus subtilis* and *Saccharomyces cerivisiae* at concentrations greater than 0.2%.

EXAMPLE 7

The procedure of Example 1 is repeated except that the methyl propiolate is replaced with an equal amount of allyl propiolate to obtain as product of the process the allyl propiolate dimer diallyl hex-2-ene-4-yne-1,6-dioate.

EXAMPLE 8

The procedure of Example 1 is repeated except that the methyl propiolate is replaced with an equimolar amount of propargyl propiolate to obtain as dimer product dipropargyl hex-2-ene-4-yne-1,6-dioate.

EXAMPLE 9

The procedure of Example 1 is repeated replacing the methyl propiolate with phenyl propiolate to obtain as dimer product diphenyl hex-2-ene-4-yne-1,6-dioate.

I claim:

1. A process for preparing dimers of propiolic acid esters,

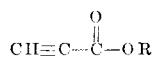

wherein R is selected from the group consisting of an alkyl group containing from 1 to about 20 carbon atoms, an aryl group containing from 6 to 12 carbon atoms, or an unsaturated alkenyl or alkynyl group containing from 3 to about 12 carbon atoms, which comprises contacting the propiolic acid ester with a tertiary amine catalyst in an inert diluent at a temperature of from about $-10°$ C. to about 100° C. to obtain as product of the resulting reaction the dimer of the propiolic acid ester defined by the structural formula

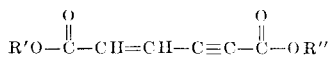

wherein R' and R'' are the ester moiety of the propiolate ester used in the process and are selected from the group R set out hereinabove.

2. A process as described in claim 1 wherein the tertiary amine is triethylenediamine.

3. A process as described in claim 1 wherein the propiolic acid ester is an alkyl propiolate having from 1 to about 20 carbon atoms.

4. A process as described in claim 3 wherein the alkyl propiolate is methyl propiolate.

5. A process as described in claim 3 wherein the alkyl propiolate is octadecyl propiolate.

6. A process as described in claim 1 wherein the propiolic acid ester is an alkenyl propiolate having from 3 to about 12 carbon atoms in the alkenyl radical.

7. A process as described in claim 6 wherein the alkenyl propiolate is allyl propiolate.

8. A process as described in claim 1 wherein the propiolic acid ester is an alkynyl propiolate having from 3 to 12 carbon atoms in the alkynyl radical.

9. A process as described in claim 8 wherein the alkynyl propiolate is propargyl propiolate.

10. A process as described in claim 1 wherein the propiolic acid ester is an aryl propiolate having from 6 to 12 carbon atoms in the aryl radical.

11. A process as described in claim 10 wherein the aryl propiolate is phenyl propiolate.

References Cited

UNITED STATES PATENTS 3,097,230   7/1963   Miller _____ 260—479 X

LORRAINE A. WEINBERGER, *Primary Examiner.*

K. ROSE, M. G. BERGER, *Assistant Examiners.*